United States Patent [19]

Wenzel et al.

[11] Patent Number: 5,360,891

[45] Date of Patent: Nov. 1, 1994

[54] COLORLESS AND TRANSPARENT, AMORPHOUSLY PROCESSABLE POLYAMIDE MOLDING COMPOSITION HAVING GOOD RESISTANCE TO STRESS CRACKING AND GOOD IMPACT STRENGTH

[75] Inventors: Markus Wenzel, Recklinghausen; Georg Oenbrink, Dülmen; Eva von der Bey-Dahm, Haltern, all of Germany

[73] Assignee: Huels Aktiengesellschaft, Marl, Germany

[21] Appl. No.: 170,747

[22] Filed: Dec. 21, 1993

[30] Foreign Application Priority Data

Apr. 3, 1993 [DE] Germany ............... 4310970

[51] Int. Cl.$^5$ .............................................. C08G 69/26
[52] U.S. Cl. ..................... 528/335; 528/336; 528/338; 528/340; 528/342; 528/346; 528/347; 528/349; 524/606; 428/332; 428/474.4; 351/41
[58] Field of Search ............... 528/335, 336, 338, 342, 528/346, 347, 349, 340; 524/606; 428/474.4, 332; 351/41

[56] References Cited

U.S. PATENT DOCUMENTS

| | | | |
|---|---|---|---|
| 2,696,482 | 12/1954 | Pease | 528/335 |
| 3,597,400 | 8/1971 | Kashiro et al. | 528/335 |
| 4,207,411 | 6/1980 | Shue | 528/338 |
| 4,369,305 | 1/1983 | Pagilagan | 528/338 |
| 4,600,640 | 7/1986 | Olson | 428/332 |
| 4,740,412 | 4/1988 | Hocker et al. | 428/194 |
| 5,166,312 | 11/1992 | Wenzel et al. | 524/606 |
| 5,300,557 | 4/1994 | Bartmann et al. | 524/606 |

FOREIGN PATENT DOCUMENTS

| | | |
|---|---|---|
| 2055262 | 5/1992 | Canada . |
| 58-053949 | 3/1983 | Japan . |
| 58-053950 | 3/1983 | Japan . |

OTHER PUBLICATIONS

CA 117(20): 193011v, "Molding compositions resistant to alcohol and boiling water", Wenzel et al., Nov. 16, 1992.

CA 99(24): 195992z "Reinforced Polyamide Compositions for automobile parts", Dec. 12, 1983.

CA 99(26): 213487v, "Polyamide Compositions for automobile parts", Dec. 26, 1983.

*Primary Examiner*—John Kight, III
*Assistant Examiner*—P. Hampton-Hightower
*Attorney, Agent, or Firm*—Oblon, Spivak, McClelland, Maier & Neustadt

[57] ABSTRACT

A colorless and transparent, amorphously processable polyamide molding composition which has a good resistance to stress cracking and good impact strength and is resistant to alcohols, esters, ketones, fuels and boiling water, comprising the reaction product of I. a linear aliphatic dicarboxylic acid;

II.a) 35–60 mol % of trans,trans-bis(4-aminocyclohexyl)-methane; and

II.b) 65–40 mol % of other aliphatic, cycloaliphatic, araliphatic or aromatic diamines as starting components, the molar ratio of components I and II varying in the range from 0.95 to 1.05:1, preferably 0.98 to 1.02:1.

The polyamide molding composition is particularly suitable for use for spectacle frames, apparatus inspection windows and covers and lamp covers.

20 Claims, No Drawings

COLORLESS AND TRANSPARENT, AMORPHOUSLY PROCESSABLE POLYAMIDE MOLDING COMPOSITION HAVING GOOD RESISTANCE TO STRESS CRACKING AND GOOD IMPACT STRENGTH

BACKGROUND OF THE INVENTION

1. Field of the Invention

The invention relates to a colorless and transparent, amorphously processable polyamide molding composition which is characterized by having good resistance to stress cracking in alcohols, esters, ketones and fuels, by resistance to boiling water and by a particular impact strength.

2. Discussion of the Background

Transparent polyamides which are resistant to boiling water are known. Thus, for example, amorphous transparent polyamides based on aromatic dicarboxylic acids such as isophthalic acid and/or terephthalic acid and aliphatic and/or cycloaliphatic diamines such as bis(4-amino-cyclohexyl)methane (i.e. para-amino cyclohexyl methane, hereinafter PACM) are described in EP-A 0 050 742, EP-A 0 069 700, U.S. Pat. No. 2,696,482, U.S. Pat. No. 3,597,400, U.S. Pat. No. 4,207,411 and U.S. Pat. No. 4,369,305.

Although polyamides having aromatic units are transparent, they are not completely colorless, but exhibit a pale yellow or beige color tinge, especially after processing. U.S. Pat. No. 2,512,606 and DE-A 20 34 541 describe transparent polyamides obtained from exclusively aliphatic and cycloaliphatic components.

Polyamides according to U.S. Pat. No. 2,512,606 comprise aliphatic dicarboxylic acids having 6–10 atoms and PACM having a trans,trans (herein after also t,t) content of less than 30%. These polyamides are not resistant to boiling water and solvents, and, like the other polyamides of the prior art, have an adequate resistance to stress cracking in, for example, alcohols, esters and ketones.

In many applications, however, transparent polyamides are in contact with these solvents in the liquid form or in an atmosphere enriched in these solvents, so that resistance to these media is absolutely essential.

Such applications are, for example, spectacle frames, apparatus inspection windows and covers or lamp covers.

DE-A 20 34 541, finally, describes polyamides based on PACM having a t,t content of 40–70% and 3-ethyl-1,10-decanedicarboxylic acid. In particular, in this specification, the following is stated on page 5, paragraph 2: "In our own experiments, it has been found that polyamides obtained from the above-mentioned diamine and dodecanedioic acid are cloudy".

Polyamides obtained from linear dicarboxylic acids and PACM having a 51% trans,trans content are described in Macromolecules, 4, 1971, page 347 et seq. As can be seen from Table I on page 348 shown there, however, these polyamides are crystalline and accordingly are not transparent.

The object of the present invention is to provide a colorless and transparent, amorphously processable polyamide molding composition which does not have the above-mentioned disadvantages of the prior art.

Surprisingly it has been found that a suitable polyamide and copolyamide molding composition based on linear, aliphatic dicarboxylic acids and bis(4-aminocyclohexyl)-methane can be prepared if the content of the trans,trans isomer in the diamine component and in the isomer mixture is not less than 35% by weight and not more than 60 mol %.

SUMMARY OF THE INVENTION

The present invention accordingly relates to a colorless and transparent, amorphously processable polyamide molding composition which has a good resistance to stress cracking and good impact strength and is resistant to alcohols, esters, ketones, fuels, and boiling water, comprising the reaction product of I. a linear aliphatic dicarboxylic acid;
II.a) 35–60 mol % of trans,trans-bis(4-aminocyclohexyl)-methane; and
II.b) 65–40 mol % of other aliphatic, cycloaliphatic, aralphatic or aromatic diamines as starting components, the molar ratio of components I and II varying in the range from 0.95 to 1.05:1, preferably 0.98 to 1.02:1.

This invention furthermore relates to a process for the preparation of a colorless and transparent, amorphously processable polyamide molding composition which has a good resistance to stress cracking and good impact strength and is resistant to alcohols, esters, ketones, fuels and boiling water, comprising polycondensating I. a linear aliphatic dicarboxylic acid; II.a) 35–60 mol % of trans,trans-bis(4-aminocyclohexyl)-methane; and
II.b) 65–40 mol % of other aliphatic, cycloaliphatic, aralphatic or aromatic diamines in the melt at a melt temperature of from 250° to 320° C., the molar ratio of components I and II varying in the range from 0.95 to 1.05:1, preferably 0.98 to 1.02:1.

Surprisingly, and in contrast to the conclusion according to DE 20 34 541, page 2, paragraph 2, it has been found that precisely with this content of trans,-trans isomer IIa, a transparent polyamide results which is furthermore distinguished by a good resistance to stress cracking and good impact strength.

In contact with boiling water, as well as alcohols, esters, ketones and fuels, the transparency is not impaired even over a prolonged period of time. In addition, surprisingly, the transparency of the polyamide molding compositions according to the invention is retained when they are stored in air at elevated temperature.

DETAILED DESCRIPTION OF THE PREFERRED EMBODIMENTS

Mixtures of the two other remaining isomers - cis,cis-PACM and cis,trans-PACM—can of course be used as the diamine component IIb. Furthermore, however, it is also possible to use other aliphatic, cycloaliphatic or aralphatic diamines as diamine components IIb, by themselves or as a mixture. The desired profile of properties of the end product determines the choice here. However, linear aliphatic diamines such as hexamethylene or decamethylenediamine are especially preferred.

The preferred range of the trans,trans content of the component IIa depends on the intended use and can easily be determined by any expert in this field by a few guideline experiments. According to the invention, this range comprises 35 to 60 mol %, but preferably 40 to 55 mol %, particularly preferably 45 to 50.5 mol % of t,t-PACM.

Suitable acid components I are linear dicarboxylic acids having 6 to 20 carbon atoms, such as, for example, octanedioic acid, decanedioic acid, dodecanedioic acid and tridecanedioic aid. n-Decanedioic acid (n-sebacic acid) and n-dodecanedioic acid are particularly preferred.

The linear aliphatic dicarboxylic acids can be replaced in part - i.e. up to the extent of 25 mol % - by branched aliphatic dicarboxylic acids such as 2-methylnonanedioic acid or dimeric fatty acids, such as, for example, PRIPOL ® 1009 (Unichema). In a preferred embodiment the dicarboxylic acid component does not comprise 3-ethyl-1,10 decane-dicarboxylic acid.

The polyamides according to the invention are prepared by the customary process by means of polycondensation in the melt, if appropriate in the presence of a polycondensation catalyst. Suitable catalysts are, for example, P-containing compounds of the formula $H_3PO_n$, where n=2, 3 or 4, in amounts of 0.001-0.5% by weight, based on the starting substances. The polycondensation is carried out batchwise or continuously at temperatures in the range from 250°-320° C., advantageously at 270°-290° C., in a polycondensation reactor, if appropriate additionally with a downstream devolatilization extruder or thin film evaporator.

The polyamide of the present invention is characterized by having a high degree of transparency to visible light of >80%, preferably >95%, more preferably >95%, when measured by a spectrophotometer.

The polyamide of the present invention is also characterized by a $\eta rel$ of >1.5, preferably >1.6–2.0, more preferably 1.6–1.85 as determined on a 0.5% strength by weight polyamide solution in m-cresol at 25° C.

In addition to the polyamides, the molding compositions can also comprise customary auxiliaries and additives, such as pigments, stabilizers, fillers and the like.

They can be processed into moldings, fibers and films by customary processes, such as injection molding, extrusion and the like.

The transparent polyamide molding compositions have diverse uses. Because of their properties, however, they are particularly suitable for spectacle frames and also for apparatus inspection windows and covers and lamp covers, especially outside and at places where the objects are often exposed to chemicals, such as, for example, at gasoline stations.

Having generally described this invention, a further understanding can be obtained by reference to certain specific examples which are provided herein for purposes of illustration only and are not intended to be limiting unless otherwise specified.

The relative solution viscosities $\eta rel$ were determined on 0.5% strength by weight polyamide solutions in m-cresol at 25° C.

The glass transition temperatures $T_g$ crystallization temperatures $T_c$ and melting points $T_m$ result from DSC measurements at heat-up rates of 20K/minute.

EXAMPLE 1

Starting substances:
   23.030 kg of dodecanedioic acid (100 mol)
   21.204 kg of bis(4-aminocyclohexyl) methane, t,t content
   49.1% (100.8 mol)
   35.387 kg of water
   4.4 g of 50% strength aqueous $H_3PO_2$ The starting substances were dissolved in water under nitrogen in a polycondensation reactor under pressure at 170° C. The temperature was increased to 215° C. and the mixture was stirred at this temperature for 1 hour, the final pressure being 20 bar. After the temperature had been increased further to 280° C., the water employed and formed by the polycondensation was distilled off, while the pressure was continuously lowered. After a reaction time of 2 hours at 280° C., the polyamide was discharged from the reactor. The values of the crystallization and fusion enthalpy are the same.
$\eta rel = 1.84$
   $T_g = 140°$ C.
   $T_c = 180°$ C.
   $T_m = 248°$ C.

EXAMPLE 2 starting substances:
   20.224 kg of sebacic acid (100 mol)
   21.204 kg of bis(4-aminocyclohexyl)methane, t,t content
   49.1% (100.8 mol)
   23.614 kg of water
   2.07 g of 100% strength $H_3PO_3$ The reaction was carried out analogously to Example 1.
$\eta rel = 1.63$
   $T_g = 149°$ C.
   $T_c = 181°$ C.
   $T_m = 269°$ C.

The values of the crystallization and fusion enthalpy are the same. The products are transparent and colorless.

The polyamides prepared according to Examples 1 and 2 and, for comparison, the transparent polyamide obtained from terephthalic acid and trimethylhexamethylenediamine (TROGAMID ® T 5000 from Hüls AG) and GRILAMID ® TR 55 from Ems (isophthalic acid, lauryllactam, 3,3'-dimethyl-PACM) were stored in water at 100° C. to evaluate the resistance to boiling water. The comparison products showed changes in the form of clouding and sticking. In contrast, the polyamides according to the invention could be stored in boiling water without change for 9 months.

A stress corrosion cracking test was carried out in accordance with DIN 53 449 Part 3 to evaluate the resistance to stress cracking. In contrast to the comparison polyamides, in which stress cracking or even fracture of test specimens was observed, the polyamides according to the invention remained defect-free when in contact with methanol, isopropanol, acetone, ethyl acetate and toluene.

The polyamide according to Example 1 was compared with TROGAMID ® T 5000 and GRILAMID ® TR 55 in notched impact strength tests in accordance with ISO 180/1A:

| Temperature [°C.] | Notched Impact strength [kJ/m²] in accordance with ISO 180/1A | | |
|---|---|---|---|
| | Example 1 | TROGAMID ® T 5000 | GRILAMID ® TR 55 |
| 23 | 20 | 12 | 7 |
| 0 | 15 | 8 | 5 |
| −40 | 10 | 5 | 3 |

Having now fully described the invention, it will be apparent to one of ordinary skill in the art that many changes and modifications can be made thereto without departing from the spirit or scope of the invention as set forth herein.

What is claimed as new and is desired to be secured by Letters Patent of the United States is:

1. A colorless and transparent, amorphously processable polyamide molding composition which has good resistance to stress cracking and good impact strength and is resistant to alcohols, esters, ketones, fuels and boiling water, comprising the reaction product of
   I. a linear aliphatic dicarboxylic acid;
   II.a) 35–60 mol % of trans,trans-bis(4-aminocyclohexyl)-methane; and
   II.b) 65–40 mol % of other aliphatic, cycloaliphatic, araliphatic or aromatic diamines the molar ratio of components I and II varying in the range from 0.95 to 1.05:1.

2. The polyamide molding composition of claim 1, wherein component I is a linear dicarboxylic acid having 6 to 14 carbon atoms, or a mixture thereof.

3. The polyamide molding composition of claims 1 or 2, wherein said linear cycloaliphatic dicarboxylic acid is selected from the group consisting of octanedioic acid, decanedioic acid, dodecanedioic acid, tridecanedioic acid and a mixture thereof.

4. The polyamide molding composition of claims 1 or 3, wherein said linear cycloaliphatic dicarboxylic acid is selected from the group consisting of n-decanedioic acid and n-dodecanedioic acid.

5. The polyamide molding composition of claims 1 or 2, comprising 35–60 mol % of component IIa and 65–40 mol % of other isomers of bis(4-aminocyclohexyl)methane as component IIb.

6. The polyamide molding composition of claims 1 or 2, wherein component IIb is selected from the group consisting of a linear aliphatic diamine, a cycloaliphatic diamine, an araliphatic diamines and a mixture thereof.

7. The polyamide molding composition of claims 1 or 2, wherein component IIb is selected from the group consisting of hexamethylenediamine, decamethylenediamine, dodecamethylenediamine, bis(4-amino-3-methyl)cyclohexylamine, trimethylhexamethylenediamine and a mixture thereof.

8. The polyamide molding composition of claims 1 or 2, comprising 40 to 55 mol % of component IIa.

9. The polyamide molding composition of claims 1 or 2, comprising 45 to 50.5 mol % of component IIa.

10. A process for the preparation of a colorless and transparent, amorphously processable polyamide molding composition which has good resistance to stress cracking and good impact strength and is resistant to alcohols, esters, ketones, fuels and boiling water, comprising polycondensation
    I. a linear aliphatic dicarboxylic acid;
    II.a) 35–60 mol % of trans,trans-bis(4-aminocyclohexyl)-methane; and
    II.b) 65–40 mol % of other aliphatic, cycloaliphatic, araliphatic or aromatic diamines in the melt at a melt temperature of 250° to 320° C., the molar ratio of components I and II varying in the range from 0.95 to 1.05:1.

11. The process of claims 10, wherein said melt temperature is 270° to 290° C.

12. The process of claims 10 or 11, wherein said polycondensation is carried out in the presence of 0.001–0.5% by weight of phosphorous-containing catalysts of the formula $H_3PO_n$, where n is an integer of 2, 3 or 4.

13. The process of claims 10 or 11, further comprising processing in a devolatilization extruder or thin film evaporator.

14. A colorless and transparent, amorphously processable polyamide molding composition which has a good resistance to stress cracking and good impact strength and is resistant to alcohols, esters, ketones, fuels and boiling water, obtained by polycondensation of
    I. a linear aliphatic dicarboxylic acid;
    II.a) 35–60 mol % of trans,trans-bis(4-aminocyclohexyl)-methane; and
    II.b) 65–40 mol % of other aliphatic, cycloaliphatic, araliphatic or aromatic diamines in the melt at a melt temperature of 250° to 320° C., the molar ratio of components I and II being in the range from 0.95 to 1.05:1.

15. A molded article comprising the polyamide molding composition of claim 1.

16. The molded article of claim 15, wherein said article is a spectacle frame.

17. The molded article of claim 15, wherein said article is an inspection window.

18. The molded article of claim 15, wherein said article is a lamp cover.

19. The polyamide molding composition of claim 1, wherein the molar ratio of components I and II is 0.98 to 1.02:1.

20. The process of claim 10 wherein the molar ratio of components I and II is 0.98 to 1.02:1.

* * * * *